(12) United States Patent
Shirakata et al.

(10) Patent No.: US 10,218,420 B2
(45) Date of Patent: Feb. 26, 2019

(54) MILLIMETER-WAVE COMMUNICATION CONTROL METHOD AND MILLIMETER-WAVE COMMUNICATION CONTROL APPARATUS

(71) Applicant: Panasonic Corporation, Osaka (JP)

(72) Inventors: Naganori Shirakata, Kanagawa (JP); Koji Takinami, Kanagawa (JP)

(73) Assignee: Panasonic Corporation, Osaka (JP)

( * ) Notice: Subject to any disclaimer, the term of this patent is extended or adjusted under 35 U.S.C. 154(b) by 168 days.

(21) Appl. No.: 15/349,826

(22) Filed: Nov. 11, 2016

(65) Prior Publication Data

US 2017/0142540 A1 May 18, 2017

(30) Foreign Application Priority Data

Nov. 17, 2015 (JP) ................................. 2015-224921

(51) Int. Cl.
*H04B 7/06* (2006.01)
*H04W 16/14* (2009.01)
(Continued)

(52) U.S. Cl.
CPC ......... *H04B 7/0617* (2013.01); *H04B 7/0695* (2013.01); *H04W 16/14* (2013.01);
(Continued)

(58) Field of Classification Search
CPC ....... H04W 16/14; H04W 48/18; H04W 4/02; H04B 7/00; H04B 7/0695; H04B 7/088; H04B 7/06
See application file for complete search history.

(56) References Cited

U.S. PATENT DOCUMENTS

| 6,188,873 B1 * | 2/2001 | Wickman | H04H 20/63 348/E7.093 |
| 8,447,334 B2 * | 5/2013 | Tsuchiya | H04W 4/16 370/331 |

(Continued)

OTHER PUBLICATIONS

IEEE STD 802.11ad-2012, "Part 11: Wireless LAN Medium Access Control (MAC) and Physical Layer (PHY) Specifications, Amendment 3: Enhancements for Very High Throughput in the 60 GHz Band", Dec. 2012.

*Primary Examiner* — Hassan Kizou
*Assistant Examiner* — Roberta A Shand
(74) *Attorney, Agent, or Firm* — Seed IP Law Group LLP

(57) ABSTRACT

A millimeter-wave controller receives, from a microwave-communication control apparatus belonging to a microwave network, a first signal including location information of a first terminal belonging thereto and a use request for the first terminal to use the millimeter-wave network. A beam range for the first terminal and a first wireless resource that is included in one or more wireless resources of one or more millimeter-wave access points and that is to be allocated to the first terminal are set based on the location information. A use permission for the millimeter-wave network and first connection information for connection to a first millimeter-wave access point corresponding to the first wireless resource are transmitted to the microwave-communication control apparatus. The first connection information differs from second connection information for a second terminal belonging to the millimeter-wave network, the second terminal connects to the first millimeter-wave access point by using the second connection information.

3 Claims, 4 Drawing Sheets

(51) Int. Cl.
*H04W 72/04* (2009.01)
*H04W 4/70* (2018.01)
*H04W 84/04* (2009.01)
*H04W 84/12* (2009.01)
*H04W 88/06* (2009.01)
*H04W 88/08* (2009.01)

(52) U.S. Cl.
CPC ............ *H04W 72/048* (2013.01); *H04W 4/70* (2018.02); *H04W 72/04* (2013.01); *H04W 84/042* (2013.01); *H04W 84/12* (2013.01); *H04W 88/06* (2013.01); *H04W 88/08* (2013.01)

(56) References Cited

U.S. PATENT DOCUMENTS

| | | | |
|---|---|---|---|
| 8,948,125 B2* | 2/2015 | Hallenstal | H04W 36/0022 370/331 |
| 9,986,470 B2* | 5/2018 | Son | H04W 36/0055 |
| 2016/0198474 A1* | 7/2016 | Raghavan | H04W 72/0466 370/335 |

* cited by examiner

MULTIBAND TERMINAL 107
→ MICROWAVE CONTROLLER 109
(S201)

MICROWAVE CONTROLLER 109
→ MILLIMETER-WAVE CONTROLLER 101
(S204)

MILLIMETER-WAVE CONTROLLER 101
→ MICROWAVE CONTROLLER 109
(S208)

MICROWAVE CONTROLLER 109
→ MULTIBAND TERMINAL 107
(S209)

MULTIBAND TERMINAL 107
→ MILLIMETER-WAVE AP 102
(S214)

MILLIMETER-WAVE AP 102
→ MULTIBAND TERMINAL 107
(S216)

MILLIMETER-WAVE CONTROLLER 101
→ MICROWAVE CONTROLLER 109
(S217)

MILLIMETER-WAVE COMMUNICATION CONTROL METHOD AND MILLIMETER-WAVE COMMUNICATION CONTROL APPARATUS

BACKGROUND

1. Technical Field

The present disclosure relates to a millimeter-wave communication control method and a millimeter-wave communication control apparatus.

2. Description of the Related Art

In recent years, with respect to a sharp increase in traffic demand, a study has been conducted on adoption of small-size base-station apparatuses that perform communication using a millimeter-wave band in order to obtain a bandwidth of 1 GHz or more. One example of implementation is a communication system (which may also be referred to as a "heterogeneous network") in which a plurality of small-size base-station apparatuses are provided in a communication area of a base-station apparatus that performs communication using a microwave band.

Since the small-size base-station apparatuses use a millimeter-wave band, the propagation loss increases. Consequently, it is difficult to increase the distance the radio wave reaches.

One method that contributes to an improvement in such propagation loss, an increase in the communication speed, and an increase in the cell area (the communication area) is a method in which a base-station apparatus performs directivity control (beamforming) by using a plurality of antenna elements (an antenna array). With the method that performs directivity control, it is possible to make the radio wave to reach a greater distance than the distance the radio wave of omnidirectional transmission reaches, by directing the radio wave to be transmitted by the base-station apparatus in the direction in which a terminal (a "terminal station apparatus" or a "station (STA)") is located (i.e., by using directivity). Thus, the method that performs directivity control can increase the cell area covered by the base-station apparatus. Also, the Signal to Interference-plus-Noise power Ratio (SINR) of the terminal can be improved. Since the method makes it possible to apply a modulation scheme and a coding rate which provide a high spectrum use efficiency, communication can be performed at high transmission speed (see, for example, IEEE 802.11ad-2012 Standard for Information Technology-Telecommunications and Information Exchange between systems-Local and Metropolitan networks-Specific requirements-Part 11: Wireless LAN Medium Access Control (MAC) and Physical Layer (PHY) Specifications Amendment 3: Enhancements for Very High Throughput in the 60 GHz Band).

In a heterogeneous network, wireless resources of a millimeter-wave network including a plurality of small-size base-station apparatuses may be secondarily used by a terminal in another system, and such an approach is also effective. For example, when a terminal that supports both a microwave network and a millimeter-wave network is using the microwave network, the terminal may be permitted to secondarily use the wireless resources of the millimeter-wave network. However, in the related art, when the wireless resources of the millimeter-wave network are secondarily used by a terminal belonging to another network, it takes time to establish an initial connection.

SUMMARY

One non-limiting and exemplary embodiment provides a millimeter-wave communication control method and a millimeter-wave communication control apparatus that can reduce the time until an initial connection for secondary use of a millimeter-wave network is established.

In one general aspect, the techniques disclosed here feature a millimeter-wave communication control method for a communication system including a microwave network and a millimeter-wave network having one or more millimeter-wave access points placed in the microwave network, the millimeter-wave communication control method comprising: receiving, by a millimeter-wave communication control apparatus belonging to the millimeter-wave network, a first signal from a microwave-communication control apparatus belonging to the microwave network, the first signal including location information of a first terminal belonging to the microwave network and a use request for the first terminal to use the millimeter-wave network; setting, by the millimeter-wave communication control apparatus, a beam range for the first terminal and a first wireless resource that is included in one or more wireless resources of the one or more millimeter-wave access points and that is to be allocated to the first terminal, based on the location information of the first terminal; and transmitting, by the millimeter-wave communication control apparatus, to the microwave-communication control apparatus, a use permission for the millimeter-wave network and first connection information for connection to a first millimeter-wave access point corresponding to the first wireless resource, to the microwave-communication control apparatus, wherein the first connection information is different from second connection information for a second terminal belonging to the millimeter-wave network, the second terminal connects to the first millimeter-wave access point by using the second connection information.

It should be noted that general or specific embodiments may be implemented as a system, a method, an integrated circuit, a computer program, a storage medium, or any selective combination thereof.

According to one aspect of the present disclosure, it is possible to reduce the time until an initial connection for secondary use of a millimeter-wave network is established.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

[Background that LED to Aspect According to Present Disclosure]

At a stage before an initial connection is established, the base-station apparatus of the related art that can control directivity does not have information with which the direction in which a terminal is located can be determined. Thus, it is difficult for the base-station apparatus to transmit signals, with directivity being directed in the direction in which the terminal exists.

Accordingly, there has been a proposed method in which a base-station apparatus divides a cell area into small ranges according to the width of directivity and transmits signals while sequentially switching the directivity to each of the divided ranges. With this method, the entire cell area can be covered through sequential operations, and the range that can be covered by the cell area can be increased through directivity control. In a heterogeneous network, when directivity-controllable small-size base-station apparatuses are arranged at a high density, the range that can be covered by the cell areas can be increased by continuing the cell areas.

However, in the heterogeneous network, small-size base-station apparatuses need to be arranged at a high density. In addition, how efficiently a terminal is connected to a small-size base-station apparatus needs to be dealt with in the heterogeneous network. With respect to the needs, it is effective for the heterogeneous network to secondary use a network of small-size base-station apparatuses which is already set as a private local area network (LAN).

Figure 1:
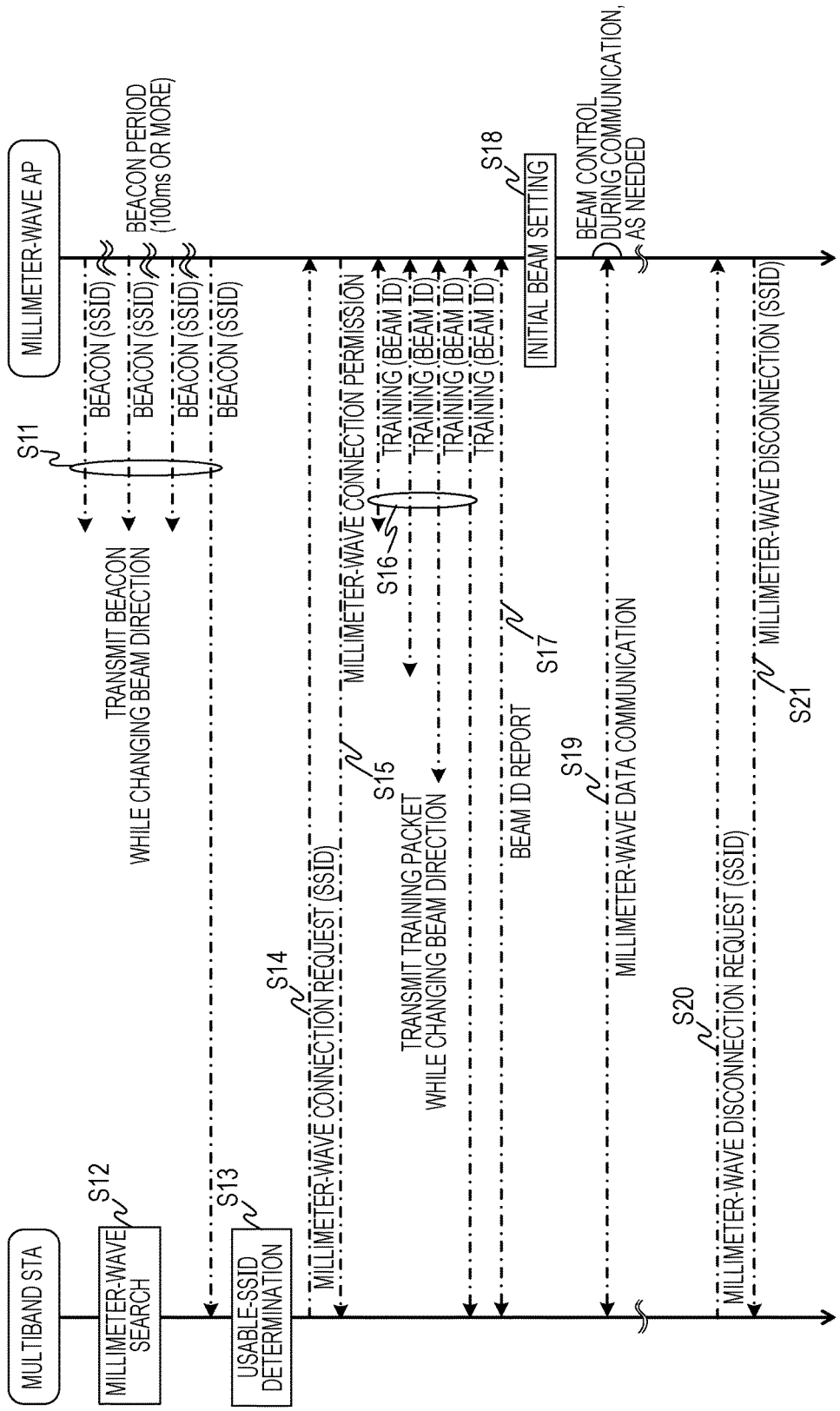
FIG. 1 illustrates operations of apparatuses in related art when wireless resources of a millimeter-wave network are secondarily used.

FIG. 1 is a sequence diagram illustrating connection processing performed when a multiband terminal (a multiband STA) that can connect to both a microwave network and a millimeter-wave network in a heterogeneous network secondarily uses a small-size base-station apparatus (which may also be referred to as a "millimeter-wave access point (AP)" hereinafter) in a millimeter-wave network (e.g., an existing private LAN).

In this case, for secondary use of the small-size base-station apparatus, connection information (a service set identifier (SSID) of the wireless LAN, a password, or the like) that is required for connection during the secondary use and that is allocated in a fixed manner is pre-reported to the user of the multiband terminal. The user uses the connection information to connect the multiband terminal to the small-size base-station apparatus.

Referring to FIG. 1, in step (hereinafter abbreviated as "S") 11, a millimeter-wave AP transmits a beacon in a beacon period (e.g., 100 ms) while changing the beam direction. The beacon includes the SSID of the millimeter-wave AP.

In S12, a multiband terminal searches for the beacon from the millimeter-wave AP. When the multiband terminal enters the cell area of the millimeter-wave communication system, and the beam direction (directivity) of the multiband terminal is directed in the transmission direction of the beacon, the multiband terminal receives the beacon.

In S13, the multiband terminal determines whether or not the millimeter-wave AP corresponding to the received beacon can be used. More specifically, when the beacon received in S12 matches the pre-reported SSID (the connection information), the multiband terminal determines that the millimeter-wave AP can be used. When the multiband terminal detects a millimeter-wave AP that can be used, the multiband terminal transmits a millimeter-wave connection request (including the SSID) to the millimeter-wave AP in S14. When the millimeter-wave AP permits the millimeter-wave connection request from the multiband terminal, the millimeter-wave AP transmits a millimeter-wave connection permission to the multiband terminal in S15.

In S16, the millimeter-wave AP performs beam training involving transmitting a training packet in each beam direction. The training packet includes a beam ID corresponding to the beam direction. After receiving the training packet, in S17, the multiband terminal reports the beam ID included in the received training packet to the millimeter-wave AP. In S18, the millimeter-wave AP sets an initial beam (a beam range) for the multiband terminal, based on the beam ID reported from the multiband terminal in S17.

After the setting of the initial beam is completed, in S19, the millimeter-wave AP and the multiband terminal start data communication (millimeter-wave data communication) using a millimeter-wave band. During the data communication, the millimeter-wave AP may perform beam directivity control on the multiband terminal again, as needed.

In S20, after the data communication is finished, the multiband terminal transmits a request for breaking the millimeter-wave connection to the millimeter-wave AP. In S21, the millimeter-wave AP breaks the millimeter-wave connection between the multiband terminal and the millimeter-wave AP.

The above-described has been given of an operation when the multiband terminal secondarily uses the millimeter-wave AP.

As described above, in order to secondarily use a millimeter-wave AP, the user (the multiband terminal) detects a millimeter-wave AP that can be secondarily used. In response to a connection request from the user, the millimeter-wave AP allocates wireless resources of a millimeter-wave band to the multiband terminal. That is, since the connection request for the millimeter-wave AP is made depending on convenience of the user, it is difficult for the millimeter-wave AP (the private LAN) to recognize the number of terminals that are to connect to the millimeter-wave AP and the states of the terminals.

When a large number of unused millimeter-wave bands (channels) exist in millimeter-wave bands (channels) allocated to each millimeter-wave AP, the unused millimeter-wave bands are efficiently used as available wireless resources through secondary use. However, when the number of unused millimeter-wave bands (channels) is small, the millimeter-wave bands are constrained by the secondary use. Thus, when a millimeter-wave bands is secondarily used, it is difficult for the millimeter-wave AP to control wireless resources to be allocated (or to be lent or rented out) to each multiband terminal.

In S20, in order to end the data communication, the multiband terminal basically transmits the millimeter-wave disconnection request to the millimeter-wave AP. However, there are cases in which the multiband terminal leaves the cell area of the millimeter-wave communication without transmitting the millimeter-wave disconnection request. In this case, it is difficult for the millimeter-wave AP to release wireless resources (management resources) that have been used for the connection with the multiband terminal that has left. Consequently, the use efficiency of the wireless resources decreases.

Also, the multiband terminal is pre-notified of the connection information for the multiband terminal to connect to the millimeter-wave AP. Thus, the connection information is fixed. Hence, after the connection information is known to a third party (a user other than the legitimate user), even the third party can connect to the millimeter-wave AP. Thus, secure communication (connection) is required in both a millimeter-wave network (a private LAN) and a heterogeneous network.

It is also desired to further reduce the time taken until an initial connection between the multiband terminal and the millimeter-wave AP is established.

One aspect according to the present disclosure is intended to allocate wireless resources of a millimeter-wave network to a terminal in a secure and efficient manner when the wireless resources are to be secondarily used by a terminal belonging to another network and to reduce the time taken until an initial connection for the secondary use is established.

One embodiment of the present disclosure will be described below in detail with reference to the accompanying drawings.

<Configuration of Communication System>

The configuration of a communication system 10 according to the present embodiment will first be described with reference to FIG. 2.

Figure 2:
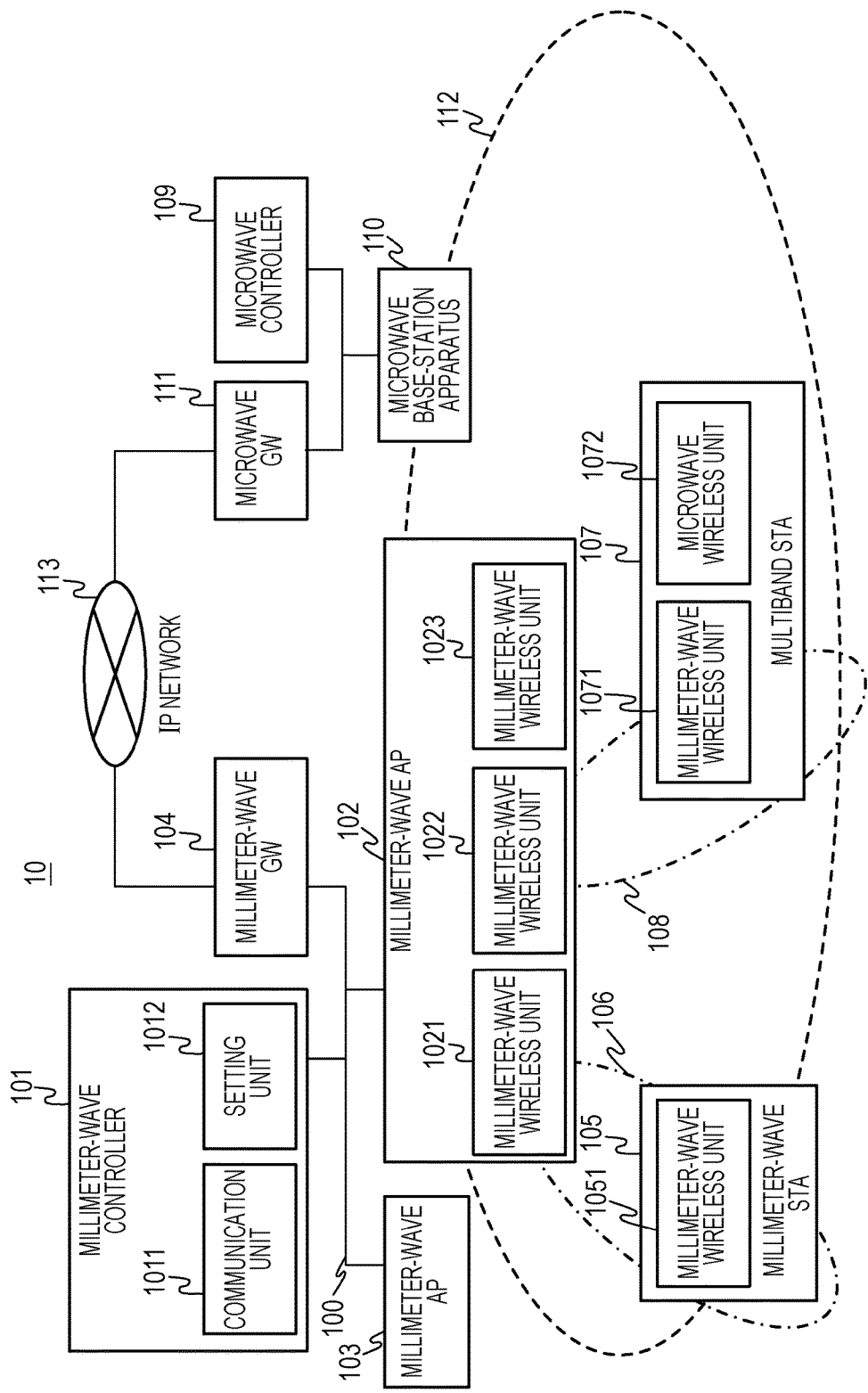
FIG. 2 illustrates the configuration of a communication system according to an embodiment of the present disclosure.

The communication system 10 illustrated in FIG. 2 includes a millimeter-wave controller (a millimeter-wave communication control apparatus) 101, a plurality of millimeter-wave access points (millimeter-wave APs) 102 and 103, a millimeter-wave gateway (a millimeter-wave GW) 104, a LAN (a private LAN) 100, a millimeter-wave terminal (millimeter-wave STA) 105, a multiband terminal (a multiband STA (a first terminal)) 107, a microwave controller (a microwave-communication control apparatus) 109, a microwave base-station apparatus 110, and a microwave gateway (a microwave GW) 111.

<Description of Millimeter-Wave Network>

The LAN 100 connects the millimeter-wave controller 101, the millimeter-wave APs 102 and 103, and the millimeter-wave GW 104. The LAN 100 is also connected to another node (not illustrated). The LAN 100 may be a network connected in a wired or wireless manner and may be implemented by, for example, a connection based on an Ethernet®, WiFi®, Universal Serial Bus (USB®), or fiber-optic communication.

The millimeter-wave GW 104 provides a connection between the LAN 100 and an internet protocol (IP) network 113, such as the Internet. The millimeter-wave GW 104 has a router function for relaying a communication from a node in the LAN 100 to outside and a communication from outside to a node in the LAN 100, a network address translation (NAT) function, a network address port translation (NAPT) function, and so on. In addition, the millimeter-wave GW 104 has a function for handling a virtual network, such as a virtual LAN (VLAN), a virtual private network (VPN), and so on.

Each millimeter-wave AP 102 or 103 performs communication with a terminal having a millimeter-wave wireless unit, for example, by using a millimeter-wave band, such as a 60 GHz band. Each millimeter-wave AP 102 or 103 performs directivity control during wireless communication. Each millimeter-wave AP 102 or 103 may include a plurality of millimeter-wave wireless units.

For example, the millimeter-wave AP 102 illustrated in FIG. 2 includes three independent millimeter-wave wireless units 1021, 1022, and 1023. Through directivity control, the millimeter-wave wireless unit 1021 forms a relatively small millimeter-wave communication area (a cell area) 106 (e.g., with the angle range of about several tens of degrees and with a distance of about several meters). Similarly, the millimeter-wave wireless unit 1023 forms a relatively small millimeter-wave communication area 108 through directivity control. The millimeter-wave wireless unit 1022 also similarly forms a relatively small millimeter-wave communication area (not illustrated).

As in the millimeter-wave AP 102, each millimeter-wave wireless unit in the millimeter-wave AP 103 forms a relatively small millimeter-wave communication area (not illustrated). Each of the millimeter-wave communication areas 106 and 108 is a relatively small range. Thus, in a millimeter-wave network, when a plurality of millimeter-wave APs is arranged, the millimeter wave communication area is increased.

The millimeter-wave terminal 105 includes a millimeter-wave wireless unit 1051 to perform wireless communication with a millimeter-wave AP. For example, in FIG. 2, the millimeter-wave terminal 105 is located in the millimeter-wave communication area 106. Thus, the millimeter-wave wireless unit 1051 in the millimeter-wave terminal 105 and the millimeter-wave wireless unit 1021 in the millimeter-wave AP 102 perform directivity control to each other to perform high-speed communication.

The millimeter-wave controller 101 controls the millimeter-wave APs 102 and 103. The millimeter-wave controller 101 controls, for example, initial connection procedures and authentication of terminals that exist in the millimeter-wave communication areas of the millimeter-wave APs 102 and 103, movement management in the millimeter-wave communication areas, the shapes of the millimeter-wave communication areas, channels allocation, and load balancing for distributing the number of accommodated terminals or the amount of communication to the millimeter-wave APs 102 and 103.

The millimeter-wave controller 101 includes a communication unit 1011 and a setting unit 1012. The communication unit 1011 includes a receiver and a transmitter. The communication unit 1011 receives, from the microwave controller 109, a use request for a terminal (in FIG. 2, the multiband terminal 107) belonging to a microwave network to use the millimeter-wave network. The use request includes terminal location information of the multiband terminal 107. Based on the terminal location information, the setting unit 1012 sets wireless resources that are included in a plurality of wireless resources of the millimeter-wave APs and that are to be allocated to the multiband terminal 107 and sets a beam range for the multiband terminal 107.

The communication unit 1011 then transmits, to the microwave controller 109, first connection information (which is hereinafter referred to as "rental information" for convenience of description) for connection to a millimeter-wave AP (a first millimeter-wave AP (the millimeter-wave AP 102 in the example in FIG. 2)) corresponding to the wireless resources allocated to the multiband terminal 107.

The first connection information (rental information) differs from second connection information for connection to the millimeter-wave AP (the first millimeter-wave AP (the millimeter-wave AP 102)) corresponding to wireless resources allocated to the millimeter-wave terminal 105 belonging to the millimeter-wave network.

<Description of Microwave NW>

The microwave base-station apparatus 110 uses, for example, a microwave band, such as a 2.4 GHz band or 5 GHz band, to perform communication with a terminal having a microwave wireless unit. Examples of the microwave communication include Wi-Fi communication, 3rd Generation Partnership Project Long Term Evolution (3GPP LTE) communication, Bluetooth® communication, and ZigBee® communication. Since the propagation distance of microwaves is large, a microwave-communication area 112 (with an angle range of 360° and with a distance of tens of meters to several kilometers) is relatively larger than a millimeter-wave communication area.

The microwave network includes, for example, one or more microwave base-station apparatuses (the microwave base-station apparatus 110 in the example in FIG. 2). The microwave controller 109 increases the microwave-communication area by controlling the microwave base-station apparatus 110. The microwave controller 109 controls, for example, initial connection procedures, authentication, and location information acquisition of one or more terminals included in the microwave-communication area, movement management in the microwave-communication area, channel allocation, transmission power control, and load balancing for distributing the number of accommodated terminals or the amount of communication to the microwave base-station apparatuses or the small-size base-station apparatuses (millimeter-wave APs). When the microwave controller 109 permits a terminal (the multiband terminal 107) belonging to the microwave network to secondarily use the millimeter-wave network, the microwave controller 109 controls, for example, an initial connection procedure for the secondary use between the millimeter-wave controller 101 and the microwave controller 109.

The microwave GW 111 has functions of a router, an NAT, an NAPT, and so on. The microwave GW 111 also has functions for handling virtual networks, such as a VLAN and a VPN.

The router has a function for providing connection between the microwave network (a core network) to which the microwave controller 109, the microwave base-station apparatus 110, and other nodes (not illustrated) are connected and the external IP network 113 and a function for relaying a communication from a node in the core network to outside or a communication from outside to a node in the core network.

<Description of Multiband Terminal>

The multiband terminal 107 includes a millimeter-wave wireless unit 1071 and a microwave wireless unit 1072. The multiband terminal 107 can independently perform wireless communication with each millimeter-wave wireless unit 1021, 1022, or 1023 in each millimeter-wave AP 100 or 102 and wireless communication with the microwave base-station apparatus 110. For example, when the multiband terminal 107 is in the microwave-communication area 112, the multiband terminal 107 performs wireless communication with the microwave base-station apparatus 110. Also, when the multiband terminal 107 moves and detects that it enters the millimeter-wave communication area 108, the multiband terminal 107 can perform wireless communication with the millimeter-wave AP 102.

<Operation of Apparatuses>

Next, a description will be given of operations of the apparatuses in the communication system 10 described above.

In following description, the multiband terminal 107 is assumed to be a node belonging to the microwave network (the core network). The microwave controller 109 authenticates and manages the multiband terminal 107.

In the present embodiment, secondary use of millimeter-wave wireless resources with a predetermined priority and in a predetermined range has been pre-determined between a business operator that installs and operates the millimeter-wave network (the LAN 100) and a business operator that installs and operates the microwave network. The millimeter-wave wireless resources include, for example, a communication bandwidth, a wireless channel, a communication area, a millimeter-wave wireless unit, a sector, a beam, and a communication time. The "secondary use" refers to use of a millimeter-wave network by a node other than nodes belonging to the millimeter-wave network. Billing processing may be performed on the secondary use, based on used millimeter-wave wireless resources.

Figure 3:
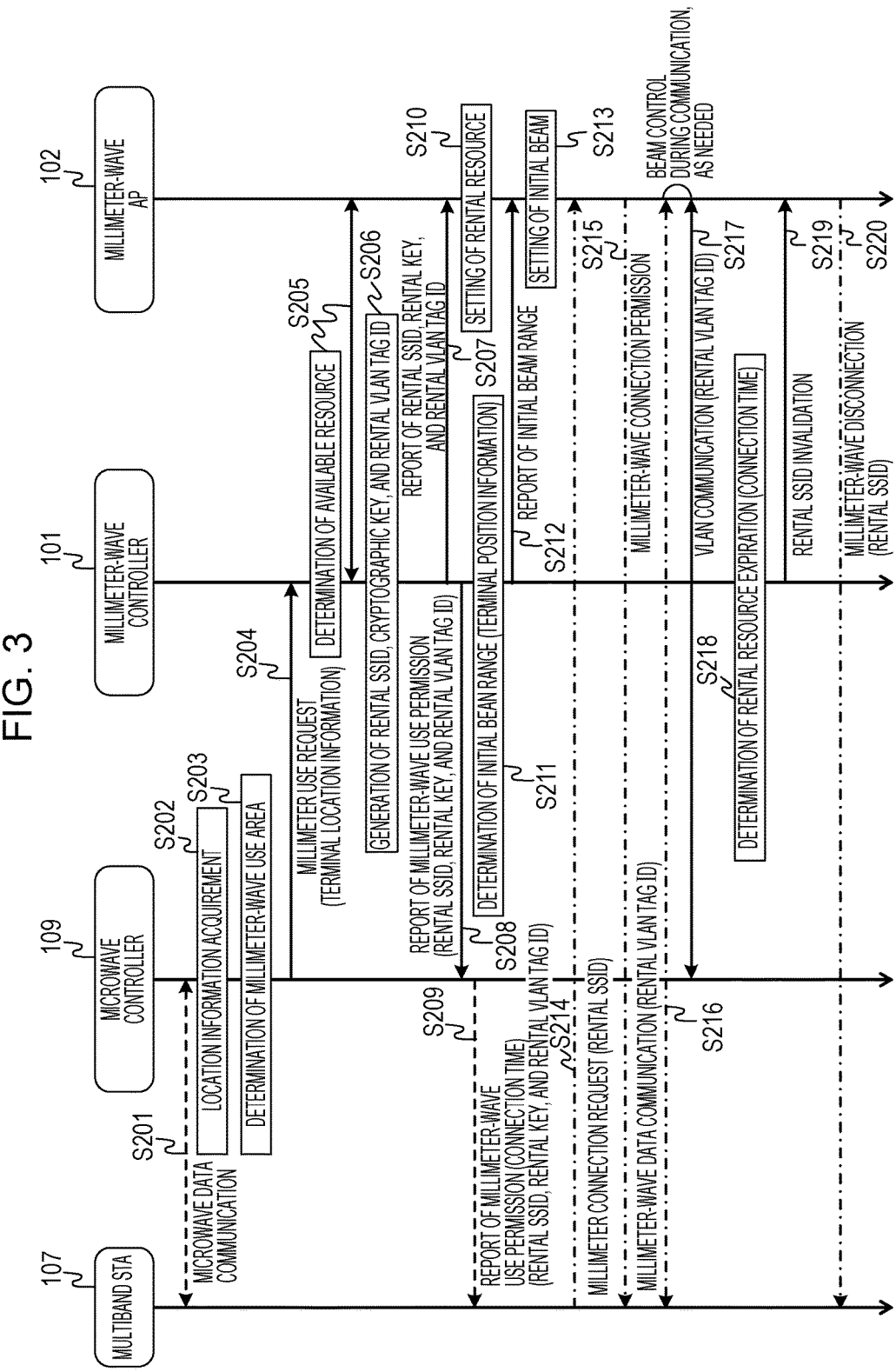
FIG. 3 illustrates operations of apparatuses in the communication system according to the embodiment of the present disclosure.

FIG. 3 illustrates an example of a sequence in which the multiband terminal 107 connects to the millimeter-wave AP 102 by secondarily using the wireless resources of the millimeter-wave network to perform communication with the microwave network. FIGS. 4A to 4G illustrate example structures of frames used in the processes illustrated in FIG. 3.

In FIG. 3, dotted-line arrows indicate microwave communications, and dashed-dotted line arrows indicate millimeter-wave communications. Solid-line arrows between the microwave controller 109 and the millimeter-wave controller 101 indicate communications performed through the microwave network, the microwave GW 111, the IP network 113, the millimeter-wave GW 104, and the LAN 100. Solid-line arrows between the millimeter-wave controller 101 and the millimeter-wave AP 102 indicate communications performed through the LAN 100.

Steps (hereinafter abbreviated as "S") for individual processes will be described in order.

Figure 4A:
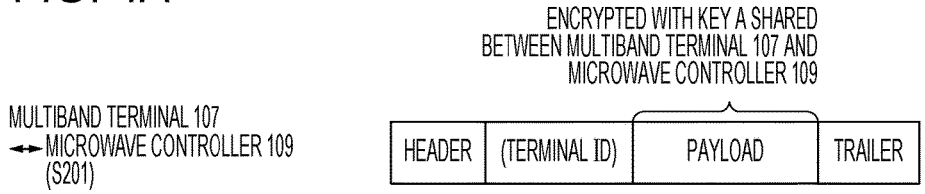
FIG. 4A illustrates an example structure of a communication frame used in a process in the communication system according to the embodiment of the present disclosure.

In S201, the multiband terminal 107 and the microwave controller 109 perform an initial connection and authentication in the microwave-communication area 112 and then perform microwave data communication. FIG. 4A illustrates an example of a frame used for the microwave data communication in S201. The frame illustrated in FIG. 4A includes a "header" including a destination address and control information, a "terminal ID" (which may be included in the header), "payload", and a "trailer" used for error correction. The payload illustrated in FIG. 4A is encrypted with a cryptographic key A pre-shared between the multiband terminal 107 and the microwave controller 109. Thus, communication between the multiband terminal 107 and the microwave controller 109 is secure.

The header and the trailer in the frame illustrated in FIG. 4A are also included in the other frames (FIGS. 4B to 4G). Descriptions of the header and the trailer are omitted in the following description in FIGS. 4B to 4G.

In S202, the microwave controller 109 acquires the location information of the multiband terminal 107, based on details of the processing in S201. For example, based on a reception signal power, global positioning system (GPS) information, gyroscope information, or the like, the microwave controller 109 acquires, as the location information of the multiband terminal 107, information indicating to which of the microwave base-station apparatuses the multiband terminal 107 is connected, information indicating where in the microwave-communication area the multiband terminal 107 is located, and so on.

In S203, based on the location information of the multiband terminal 107 acquired in S202, the microwave controller 109 determines whether or not a millimeter-wave network that can be secondarily used exists in the vicinity of the location of the multiband terminal 107. A positional relationship between the microwave-communication area and the millimeter-wave communication area that can be secondarily used is, for example, pre-registered in a database or like.

For example, the microwave controller 109 first determines whether or not the position of the multiband terminal 107, the amount of communication thereof, and the speed of movement thereof are suitable for using the millimeter-wave network. Upon determining that the multiband terminal 107 is not suitable for using the millimeter-wave network, the microwave controller 109 repeats the processes in S201 to S203 to continue the microwave communication. On other hand, upon determining that the multiband terminal 107 is suitable for using the millimeter-wave network, the microwave controller 109 advances to a process in S204.

Figure 4B:
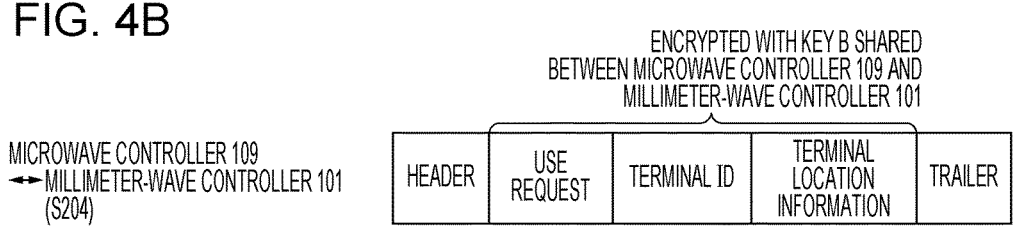
FIG. 4B illustrates an example structure of a communication frame used in a process in the communication system according to the embodiment of the present disclosure.

In S204, the microwave controller 109 issues a millimeter-wave use request to the millimeter-wave controller 101 in order to connect the multiband terminal 107 to the millimeter-wave network. FIG. 4B illustrates an example of a frame used for the millimeter-wave use request in S204. The frame illustrated in FIG. 4B includes data indicating "use request", a "terminal ID" of a terminal that secondarily uses the millimeter-wave network (the terminal ID corresponds to the ID of the multiband terminal 107 and may be implemented by, for example, a MAC address of the millimeter-wave wireless unit 1071), and "terminal location information" indicating the location information of the terminal that secondarily uses the millimeter-wave network.

Data including the use request, the terminal ID, and the terminal location information is encrypted with a cryptographic key B pre-shared between the microwave controller 109 and the millimeter-wave controller 101. Thus, communication between the microwave controller 109 and the millimeter-wave controller 101 is secure.

In S204, the millimeter-wave controller 101 receives, from the microwave controller 109, a signal (a first signal) including a request for the multiband terminal 107 to use the millimeter-wave network. In S205, based on the data received from the microwave controller 109 in S204, the millimeter-wave controller 101 determines whether or wireless resources that can be allocated to the multiband terminal 107 (i.e., available wireless resources that can be used for secondary use) exist in the wireless resources of the millimeter-wave APs in the millimeter-wave network (the LAN 100). For example, the millimeter-wave controller 101 determines whether or not available wireless resources exist, by querying each millimeter-wave AP about, for example, whether or not wireless resources (a millimeter-wave wireless unit, a sector, a beam, a communication band, or the like) that form a millimeter-wave communication area are available at a terminal location indicated by the terminal location information received in S204 (whether or not the wireless resources of the millimeter-wave AP are unoccupied by millimeter-wave terminals belonging to the LAN 100).

In the example illustrated in FIG. 2, the millimeter-wave wireless unit 1023 in the millimeter-wave AP 102 is assumed to be available. Accordingly, based on the location information of the multiband terminal 107, the millimeter-wave controller 101 determines that the wireless resources of the millimeter-wave communication area 108 formed by the millimeter-wave wireless unit 1023 can be allocated to the multiband terminal 107.

Thus, the millimeter-wave controller 101 sets the wireless resources of the millimeter-wave communication area 108 as wireless resources (hereinafter may be referred to as "rental resources" for convenience of description) to be allocated to the multiband terminal 107. Upon determining that there are no wireless resources that can be secondarily used for the multiband terminal 107, the millimeter-wave controller 101 returns a millimeter-wave use non-permission notification to the microwave controller 109 by using a frame corresponding to S208 described below.

In S206, based on the result of the determination in S205, the millimeter-wave controller 101 generates the first connection information (which may also be referred to as "rental information" hereinafter) for connection to the millimeter-wave AP (first millimeter-wave AP) 102 corresponding to the wireless resources (the wireless resources that can be secondarily used) to be allocated to the multiband terminal 107. The first connection information includes a "rental SSID" indicating the ID of the millimeter-wave AP by (to) which the multiband terminal 107 uses (connects), a "rental key" that is a cryptographic key used for millimeter-wave communication between the millimeter-wave AP 102 and the multiband terminal 107, and a "VLAN tag (rental VLAN tag ID)" for constructing a virtual network for the multiband terminal 107 to connect to the microwave network through the millimeter-wave network.

The first connection information (the rental information) for the multiband terminal 107 to connect to the millimeter-wave AP 102 differs from the second connection information (an SSID and a cryptographic key) for a millimeter-wave terminal belonging to the millimeter-wave network to connect to the millimeter-wave AP 102. That is, the rental SSID is generated as a virtual SSID different from the SSID that is the ID of the millimeter-wave AP 102. A virtual MAC address is also generated independently of the MAC address of the millimeter-wave AP 102. The rental key is also a cryptographic key different from the cryptographic key used in the millimeter-wave network. The rental VLAN tag ID is used in order to separate data from the multiband terminal 107 from data of a node (a millimeter-wave terminal) belonging to the LAN 100.

That is, the first connection information for secondarily using the millimeter-wave network includes parameters that are independent from the second connection information used in the LAN 100 and that are temporarily (in a time-limiting manner) set exclusively for the terminal (the multiband terminal 107) that secondarily uses the millimeter-wave network. Also, a validity period of use for a terminal that secondarily uses the millimeter-wave network may be set in the first connection information. With this arrangement, it is possible prevent the multiband terminal 107 from secondarily using the millimeter-wave network by using the first connection information that has been issued once. As a result, it is possible to prevent the wireless resources of the LAN 100 from being continuously constrained.

The values of parameters in the rental information may be set to values that are different from each other each time the rental information is issued.

In S207, the millimeter-wave controller 101 reports the first connection information generated by the millimeter-wave controller 101 in S206 to the millimeter-wave AP 102.

Figure 4C:
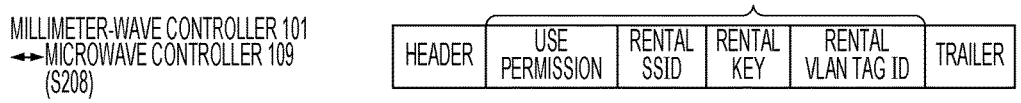
FIG. 4C illustrates an example structure of a communication frame used in a process in the communication system according to the embodiment of the present disclosure.

In S208, the millimeter-wave controller 101 reports the first connection information generated by the millimeter-wave controller 101 in S206 and a millimeter-wave use permission to the microwave controller 109. FIG. 4C illustrates one example of a frame used in S208. The frame illustrated in FIG. 4C includes data indicating "use permission" and the first connection information (the rental SSID, the rental key, and the rental VLAN tag ID) for connection to the millimeter-wave AP 102 whose secondary use by the multiband terminal 107 is permitted. The data indicating the use permission in FIG. 4C may include a validity period of the first connection information and/or a frequency channel number used for connection. The data indicating the use permission and the first connection information are encrypted with the cryptographic key B. Thus, communication between the millimeter-wave controller 101 and the microwave controller 109 is secure. Of the use permission and the first connection information, the use permission does not necessarily have to be transmitted.

Figure 4D:
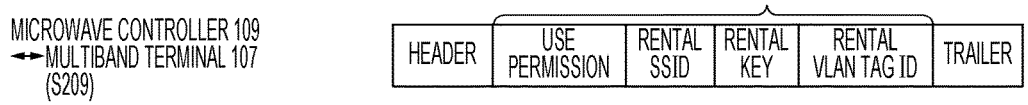
FIG. 4D illustrates an example structure of a communication frame used in a process in the communication system according to the embodiment of the present disclosure.

The microwave controller 109 receives the millimeter-wave use permission and the first connection information from the millimeter-wave controller 101 in S208, and in S209, the microwave controller 109 reports the millimeter-wave use permission and the first connection information to the multiband terminal 107 via the microwave base-station apparatus 110. FIG. 4D illustrates one example of a frame used in S209. The contents of data included in the frame illustrated in FIG. 4D are the same as or similar to those of the frame (see FIG. 4C) used in S208. However, the data included in the frame illustrated in FIG. 4D is encrypted with the cryptographic key A. Thus, communication between the microwave base-station apparatus 110 and the multiband terminal 107 is secure.

In S210, based on the first connection information received by the millimeter-wave AP 102 in S207, the millimeter-wave AP 102 sets wireless resources (rental resources) to be allocated to multiband terminal 107.

In S211, the millimeter-wave controller 101 determines an initial beam range of the millimeter-wave AP 102, based on the location information of the multiband terminal 107, the location information being indicated by the terminal location information received by the millimeter-wave controller 101 in S204.

At a stage before an initial connection is established, the base-station apparatus (e.g., see FIG. 1) of the related art does not have information for determining the direction in which the terminal is located. Thus, it is difficult for the base-station apparatus of the related art to transmit a signal, with its directivity (beam) being directed to the direction in which the terminal is located. Consequently, the base-station apparatus of the related art performs beam training using a training packet (S16 illustrated in FIG. 1). In contrast, in the present embodiment, in the initial connection processing for the multiband terminal 107 to secondary use the millimeter-wave network, the location information of the multiband terminal 107 has been reported to the millimeter-wave controller 101 in advance (S204 in FIG. 3). Thus, based on the location information of the multiband terminal 107, the millimeter-wave controller 101 can narrow down a range (an initial beam range) for initial scanning. That is, it is sufficient that the millimeter-wave controller 101 controls the millimeter-wave AP 102 so that the direction in which the multiband terminal 107 is located is included in the initial beam range. Hence, in the present embodiment, it is possible to quickly search for a millimeter-wave radio wave of the multiband terminal 107, and it is possible to reduce the time taken for searching for a millimeter-wave radio wave (i.e., the time taken for establishing an initial connection).

In S212, the millimeter-wave controller 101 reports the initial beam range determined by the millimeter-wave controller 101 in S211 to the millimeter-wave AP 102. In S213, based on the initial beam range received by the millimeter-wave AP 102 in S212, the millimeter-wave AP 102 sets an initial beam (initial directivity) for searching for and connecting to the multiband terminal 107, and waits for receiving a connection request from the multiband terminal 107.

Figure 4E:
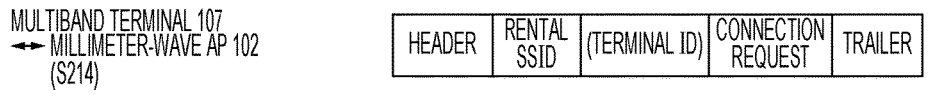
FIG. 4E illustrates an example structure of a communication frame used in a process in the communication system according to the embodiment of the present disclosure.

In S214, based on the first connection information received by the multiband terminal 107 in S209, the multiband terminal 107 issues a millimeter-wave connection request to the millimeter-wave AP 102. FIG. 4E illustrates one example of a frame used in S214. The frame illustrated in FIG. 4E includes the rental SSID indicating the ID of the millimeter-wave AP 102 that is a connection target, the terminal ID indicating the ID of the multiband terminal 107 (the rental SSID and the terminal ID may be included in the header), and data indicating a connection request.

In S215, in response to the millimeter-wave connection request received by the millimeter-wave AP 102 in S214, the millimeter-wave AP 102 reports a millimeter-wave connection permission to the multiband terminal 107 and establishes a millimeter-wave communication. Thus, the multiband terminal 107 starts a millimeter-wave communication between the millimeter-wave AP 102 and the multiband terminal 107.

Figure 4F:
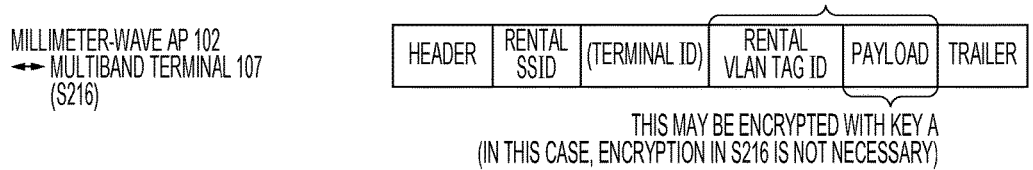
FIG. 4F illustrates an example structure of a communication frame used in a process in the communication system according to the embodiment of the present disclosure.

In S216, the multiband terminal 107 performs a millimeter-wave data communication with the millimeter-wave AP 102. FIG. 4F illustrates one example of a frame used in S216. The frame illustrated in FIG. 4F includes the rental VLAN tag ID for the virtual network and payload. The rental VLAN tag ID and the payload are encrypted with a rental key.

In FIG. 4F, the payload is data exchanged between the multiband terminal 107 and the microwave controller 109. Thus, the payload may be encrypted with the key A shared between the multiband terminal 107 and the microwave controller 109. In this case, the payload encryption performed in S217 described below is not necessary.

Figure 4G:
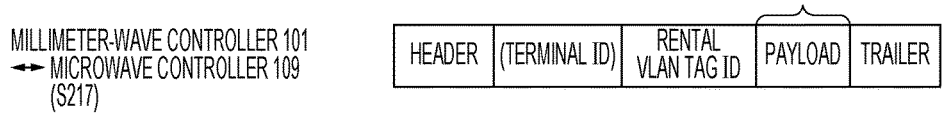
FIG. 4G illustrates an example structure of a communication frame used in a process in the communication system according to the embodiment of the present disclosure.

In S217, the millimeter-wave AP 102 performs a VLAN communication with the microwave controller 109 via the millimeter-wave controller 101. FIG. 4G illustrates one example of a frame used in S217. The payload included in the frame illustrated in FIG. 4G is encrypted with the key B shared between the millimeter-wave controller 101 and the microwave controller 109. When the payload is encrypted with the key A in the process in S216, the payload field does not necessarily have to be encrypted with the key B in S217.

A virtual network based on the rental VLAN tag ID is constructed on the LAN 100 and the IP network 113. Thus, data communicated through secondary use of the millimeter-wave network and data of a node (a millimeter-wave terminal) belonging to the LAN 100 are communicated independently from each other.

In S218, the millimeter-wave controller 101 makes a rental resource expiration determination, based on the validity period (connection time) of the rental resources. When the validity period of the rental resources expires, in S219, the millimeter-wave controller 101 issues, to the millimeter-wave AP 102, a notification indicating that the rental SSID and the rental key are invalidated.

In S220, the millimeter-wave AP 102 performs processing for disconnecting the millimeter-wave connection with the multiband terminal 107 connected to the rental SSID that expired in S219. As a result, the millimeter-wave AP 102 and the multiband terminal 107 can properly break the connection between the millimeter-wave AP 102 and the multiband terminal 107 that is secondarily using the wireless resources of the millimeter-wave AP 102. For example, when the multiband terminal 107 that is secondary using the millimeter-wave AP 102 leaves the millimeter-wave area of the millimeter-wave AP 102, and the validity period of the rental resources expires, the millimeter-wave AP 102 can break the millimeter-wave communication between the multiband terminal 107 connected to the millimeter-wave AP 102 by using the rental information (the first connection information) and the millimeter-wave AP 102. Thus, it is possible prevent the multiband terminal 107 from secondarily using the millimeter-wave network by using the first connection information that has been issued once. Accordingly, the millimeter-wave AP 102 can prevent the wireless resources of the LAN 100 from being continuously constrained.

The above description has been given of operations of the individual apparatuses in the communication system 10.

As described above, in the present embodiment, the millimeter-wave controller 101 executes wireless-resource control so as to effectively utilize available wireless resources under a constraint condition for fairness with the millimeter-wave terminal 105 belonging to the millimeter-wave network (the LAN 100).

More specifically, upon receiving a request for secondarily using the millimeter-wave network, the millimeter-wave controller 101 sets, as rental resources, resources that are available for the secondary use and reports the set rental resources to the microwave controller 109. With this arrangement, the communication system 10 can efficiently secondarily use wireless resources (available resources) that are not used by nodes (terminals) belonging to the millimeter-wave network (the LAN 100) and that are included in the millimeter-wave APs installed at a high density in order to increase the millimeter-wave communication area. That is, upon receiving the request for secondarily using the millimeter-wave network, the millimeter-wave controller 101 can control wireless resources that are to be allocated (or to be lent or rented out) to the multiband terminal 107, in accordance with the use status of the wireless resources in the millimeter-wave network.

Also, when the millimeter-wave controller 101 is to permit the multiband terminal 107 to secondarily use the wireless resources of the millimeter-wave network, the millimeter-wave controller 101 issues the first connection information (the rental SSID, the rental key, and the rental VLAN tag ID), which are different from the second connection information (the SSID and the cryptographic key) for a millimeter-wave terminal belonging to the millimeter-wave network. That is, by issuing the temporarily available rental information for the secondary use, the millimeter-wave controller 101 can limit a secondary user and can realize secure communication. For example, even when the rental information is known to a third party, the values of the parameters in the rental information vary each time the millimeter-wave network is secondarily used, thus making it possible to prevent a user (the third party) other than the legitimate user from connecting to the millimeter-wave AP.

In addition, by setting the validity period of the rental resources, the millimeter-wave controller 101 can prevent a reduction in the use efficiency of the wireless resources, the reduction being caused when wireless resources (management resources) are not released.

Additionally, during establishment of an initial connection for secondary use, the millimeter-wave controller 101 determines an initial beam range of the millimeter-wave AP 102 by using the location information of the multiband terminal 107. This makes it possible to reduce the time taken for determining the initial beam range, that is, the time until the initial connection is established.

As described above, according to the present embodiment, when wireless resources of a millimeter-wave network are to be secondarily used by a terminal belonging to another network, wireless resources can be allocated in a secure and efficient manner. Also, according to the present embodiment, it is possible to reduce the time until the initial connection for the secondary use is established. Hence, in the present embodiment, even when millimeter-wave communication areas having small coverages and having high directivities are arranged at a high density in the communication system 10, the use efficiency can be enhanced, and the system capacity can be increased.

In FIG. 3, when the millimeter-wave use permission received by the multiband terminal 107 in S209 includes the validity period (the connection time) of the rental resources, the multiband terminal 107 may make a rental resource expiration determination, as in the millimeter-wave controller 101 in S218. With this arrangement, for example, even when the multiband terminal 107 fails to receive a millimeter-wave communication disconnection instruction from the millimeter-wave AP 102 in S220, the multiband terminal 107 can detect expiration of the rental resources. This makes it possible to prevent a reduction in the use efficiency of the wireless resources, the reduction being caused when wireless resources are not released.

Although some embodiments have been described above with reference to the accompanying drawings, it goes without saying that the present disclosure is not limited to such examples. It is apparent to those skilled in the art that various changes and modifications can be conceived within the scope recited in the claims, and it is to be understood that such changes and modifications also naturally belong to the technical scope of the present disclosure. The constituent elements in the embodiment described above may also be combined together in a scope without departing from the subject matter of the present disclosure.

Although the description in each embodiment has been given of an example in which the present disclosure is realized using hardware, the present disclosure can also be realized using software in cooperation with hardware.

The functional blocks used in the description of each embodiment can typically be realized as a large-scale integrated (LSI) circuit having an input terminal and an output terminal. The integrated circuit may control the functional blocks used in the description of the above embodiment and may have an input and an output. The functional blocks may be individually integrated into single chips or at least one or all of the functional constituent elements may be integrated into a single chip. Although the functional blocks are implemented in the form of an LSI in this case, they may also be called an integrated circuit (IC), a system LSI, a super LSI, or an ultra LSI depending on a difference in the degree of integration.

The scheme for integrating the functional blocks into an integrated circuit is not limited to a scheme for LSI and may be realized with a dedicated circuit or a general-purpose processor. The functional blocks can also be implemented using a field programmable gate array (FPGA) that can be programmed after manufacture of an LSI or a reconfigurable processor that allows reconfiguration of connections or settings of circuit cells in an LSI.

In addition, when a technology for circuit integration that replaces LSI becomes available with the advancement of a semiconductor technology or another derivative technology, such a technology may also naturally be used to integrate the functional blocks. For example, biotechnology is applicable to the integration.

<Brief Summary of Present Disclosure>

A millimeter-wave communication control method in the present disclosure is directed to a millimeter-wave communication control method for a communication system including a microwave network and a millimeter-wave network having one or more millimeter-wave access points placed in the microwave network, the millimeter-wave communication control methodcomprising: receiving, by a millimeter-wave communication control apparatus belonging to the millimeter-wave network, a first signal from a microwave-communication control apparatus belonging to the microwave network, the first signal including location information of a first terminal belonging to the microwave network and a use request for the first terminal to use the millimeter-wave network; setting, by the millimeter-wave communication control apparatus, a beam range for the first terminal and a first wireless resource that is included in one or more wireless resources of the one or more millimeter-wave access points and that is to be allocated to the first terminal, based on the location information of the first terminal; and transmitting, by the millimeter-wave communication control apparatus, a use permission for the millimeter-wave network and first connection information for connection to a first millimeter-wave access point corresponding to the first wireless resource, to the microwave-communication control apparatus, the first connection information is different from second connection information for a second terminal belonging to the millimeter-wave network, the second terminal connects to the first millimeter-wave access point by using the second connection information.

In the millimeter-wave communication control method in the present disclosure, the first connection information may include a validity period for the first terminal to use the millimeter-wave network; and when the validity period expires, the millimeter-wave communication control apparatus may issue a notification indicating that the first connection information is invalidated with respect to the first millimeter-wave access point.

In the millimeter-wave communication control method in the present disclosure, the first connection information may include at least one of an SSID indicating the first millimeter-wave access point, a cryptographic key used for millimeter-wave communication between the first terminal and the first millimeter-wave access point, and an ID indicating a virtual network for the first terminal to connect to the microwave network through the millimeter-wave network.

A millimeter-wave communication control apparatus in the present disclosure is directed to a millimeter-wave communication control apparatus in a communication system including a microwave network and a millimeter-wave network having one or more millimeter-wave access points placed in the microwave network, the millimeter-wave communication control apparatus belonging to the millimeter-wave network. The millimeter-wave communication control apparatus includes: reception circuitry, which in operations, receives a first signal from a microwave-communication control apparatus belonging to the microwave network, the first signal including location information of a first terminal belonging to the microwave network and a use request for the first terminal to use the millimeter-wave network; setting circuitry, which in operations, sets a beam range for the first terminal and a first wireless resource that is included in one or more wireless resources of the one or more millimeter-wave access points and that is to be allocated to the first terminal, based on the location information of the first terminal; and transmission circuitry, which in operations, transmits, to the microwave-communication control apparatus, a use permission for the millimeter-wave network and first connection information for connection to a first millimeter-wave access point corresponding to the first wireless resource, the first connection information is different from second connection information for a second terminal belonging to the millimeter-wave network, the second terminal connects to the first millimeter-wave access point by using the second connection information.

The present disclosure is advantageously applied to a mobile communications system.

What is claimed is:

1. A millimeter-wave communication control method for a communication system including a microwave network and a millimeter-wave network having one or more millimeter-wave access points placed in the microwave network, the millimeter-wave communication control method comprising:

receiving, by a millimeter-wave communication control apparatus belonging to the millimeter-wave network, a first signal from a microwave-communication control apparatus belonging to the microwave network, the first signal including location information of a first terminal belonging to the microwave network and a use request for the first terminal to use the millimeter-wave network;

setting, by the millimeter-wave communication control apparatus, a beam range for the first terminal and a first wireless resource that is included in one or more wireless resources of the one or more millimeter-wave access points and that is to be allocated to the first terminal, based on the location information of the first terminal; and transmitting, by the millimeter-wave communication control apparatus, a use permission for the millimeter-wave network and first connection information for connection to a first millimeter-wave access point corresponding to the first wireless resource, to the microwave-communication control apparatus, wherein the first connection information is different from second connection information for a second terminal belonging to the millimeter-wave network, the second terminal connects to the first millimeter-wave access point by using the second connection information, wherein:

the first connection information includes a validity period for the first terminal to use the millimeter-wave network; and when the validity period expires, the millimeter-wave communication control apparatus issues a notification indicating that the first connection information is invalidated with respect to the first millimeter-wave access point.

2. The millimeter-wave communication control method according to claim 1, wherein the first connection information includes at least one of a service set identifier (SSID) indicating the first millimeter-wave access point, a cryptographic key used for millimeter-wave communication between the first terminal and the first millimeter-wave access point, and an identifier (ID) indicating a virtual network for the first terminal to connect to the microwave network through the millimeter-wave network.

3. A millimeter-wave communication control apparatus in a communication system including a microwave network and a millimeter-wave network having one or more millimeter-wave access points placed in the microwave network, the millimeter-wave communication control apparatus belonging to the millimeter-wave network and comprising:

reception circuitry, which in operations, receives a first signal from a microwave-communication control apparatus belonging to the microwave network, the first signal including location information of a first terminal belonging to the microwave network and a use request for the first terminal to use the millimeter-wave network;

setting circuitry, which in operations, sets a beam range for the first terminal and a first wireless resource that is included in one or more wireless resources of the one or more millimeter-wave access points and that is to be allocated to the first terminal, based on the location information of the first terminal; and transmission circuitry, which in operations, transmits, to the microwave-communication control apparatus, a use permission for the millimeter-wave network and first connection information for connection to a first millimeter-wave access point corresponding to the first wireless resource, wherein the first connection information is different from second connection information for a second terminal belonging to the millimeter-wave network, the second terminal connects to the first millimeter-wave access point by using the second connection information, wherein:

the first connection information includes a validity period for the first terminal to use the millimeter-wave network; and when the validity period expires, the millimeter-wave communication control apparatus issues a notification indicating that the first connection information is invalidated with respect to the first millimeter-wave access point.

* * * * *